United States Patent

Uesaka et al.

[11] Patent Number: 5,890,847
[45] Date of Patent: Apr. 6, 1999

[54] CUTTING TOOL FOR MILLING

[75] Inventors: Shinya Uesaka; Tetsuo Nakai, both of Hyogo, Japan

[73] Assignee: Sumitomo Electric Industries, Ltd., Osaka, Japan

[21] Appl. No.: 50,597

[22] Filed: Mar. 30, 1998

[30] Foreign Application Priority Data

Apr. 4, 1997 [JP] Japan ................................. 9-086273

[51] Int. Cl.$^6$ ...................................................... B23C 5/20
[52] U.S. Cl. ........................................... 407/119; 407/118
[58] Field of Search .......................... 407/113–116, 119, 407/118

[56] References Cited

U.S. PATENT DOCUMENTS

| | | | |
|---|---|---|---|
| 3,767,371 | 10/1973 | Wentorf et al. | 51/307 |
| 4,788,166 | 11/1988 | Araki | 501/96 |
| 5,328,875 | 7/1994 | Ueda | 501/87 |
| 5,466,642 | 11/1995 | Tajima | 501/96 |
| 5,508,240 | 4/1996 | Komatsu | 501/96 |
| 5,712,030 | 1/1998 | Goto | 407/119 |
| 5,807,032 | 9/1998 | Abe | 407/118 |

FOREIGN PATENT DOCUMENTS 08141822  6/1996  Japan .

*Primary Examiner*—Andrea L. Pitts
*Assistant Examiner*—Mark Williams
*Attorney, Agent, or Firm*—W. F. Fasse; W. G. Fasse

[57] ABSTRACT

A cutting tool for milling comprises an insert consisting of a cubic boron nitride sintered body having heat conductivity of at least 400 W/m.K at 120° C. and a thermal expansion coefficient within the range of at least $3.0 \times 10^{-6}$/K and not more than $4.0 \times 10^{-6}$/K in the temperature range of 20° C. to 600° C. According to this cutting tool for milling, sufficient tool life can be attained in high-speed face milling under a wet condition and high-speed end milling under a wet condition.

7 Claims, 1 Drawing Sheet

CUTTING TOOL FOR MILLING

BACKGROUND OF THE INVENTION

1. Field of the Invention

The present invention relates to a cutting tool for milling having an insert of a cubic boron nitride sintered body which is employed for milling cast iron components or the like, and more particularly, it relates to a cutting tool for milling such as a milling cutter or an end mill which enables high-speed milling of cast iron components with long life.

2. Description of the Prior Art

In general, cast iron components for automobile engines or electrical appliances are face-milled or end-milled with a high-speed steel tool, a cemented carbide tool, a coated tool, a ceramics tool or a tool of a cubic boron nitride (hereinafter referred to as CBN) sintered body.

FIGS. 1A and 1B show a face milling tool, to which the present invention is applied. In this face milling tool, a plurality of throwaway tips prepared by brazing CBN sintered bodies 2 to only upper surfaces in the vicinity of single ends of bases 1 consisting of cemented carbide blocks are radially mounted on the outer periphery of a cutter body 5 as shown in FIG. 1B, with pressers 6 and clamp screws 7. In relation to such a face milling tool, Japanese Patent Laying-Open No. 8-141822 (1996) in the name of the assignee proposes a throwaway tip consisting of a CBN sintered body and a cutter for milling, which enables high-speed face milling of components consisting of gray cast iron with long life by optimizing the shapes of an insert, a minor insert, a negative land etc. of the throwaway tip.

Cutting speeds V practically employed for face-milling cast iron with a cemented carbide or coated tool and a ceramics tool are about 150 to 250 m/min. and about 400 m/min. respectively. On the other hand, a CBN tool which is excellent in wear resistance and applicable to high-speed cutting, such as the throwaway tip for milling proposed in the aforementioned gazette, for example, is capable of working cast iron at a cutting speed V of 500 to 1500 m/min. under a dry condition.

A cutting speed V practically employed for end-milling cast iron with a high-speed steel, cemented carbide or coated tool is about 30 to 100 m/min. On the other hand, a CBN tool is capable of working cast iron at a cutting speed V of 100 to 1500 m/min. under a dry condition.

As hereinabove described, the CBN sintered body tool is capable of face-milling cast iron at the cutting speed V of 500 to 1500 m/min. under a dry condition. Under a wet condition, however, the CBN sintered body tool is employed at a practical cutting speed V within the range of 500 to 700 m/min. If the cutting speed V exceeds this range, the insert of the CBN sintered body tool is heat-cracked to remarkably reduce the tool life.

This is because the insert which is heated to an extremely high temperature when coming into contact with workpieces is rapidly quenched in slipping and heat-cracked by the heat cycle applied thereto in case of cutting cast iron at a high speed under a wet condition, while the CBN sintered body, which has higher heat conductivity and a lower thermal expansion coefficient as compared with cemented carbide or ceramics, can withstand thermal shock with small temperature difference in a heat cycle under a dry condition.

As hereinabove described, the CBN sintered body tool is capable of end-milling cast iron at the cutting speed V of 100 to 1500 m/min. under a dry condition. Under a wet condition, however, the CBN sintered body tool is employed at a practical cutting speed V within the range of 100 to 300 m/min. If the cutting speed V exceeds this range, the insert is heat-cracked to remarkably reduce the tool life similarly to the case of face milling.

It is conceived that the tool life is reduced under a wet condition since the heat conductivity of the conventional CBN sintered body is less than 400 W/m.K under 20° C. and a remarkable temperature gradient is caused in the vicinity of its cutting edge and high tensile stress is applied to the insert in quenching with respect to the temperature difference in the heat cycle under the wet condition due to the low heat conductivity even if the thermal expansion coefficient exceeds $4.0\times10^{-6}$/K in the temperature range of 20° C. to 600° C., and heat cracking readily results from repetition of remarkable expansion and contraction due to the high thermal expansion coefficient.

If the cutting speed V of the CBN sintered body tool is increased under a wet condition similarly to that under a dry condition, the tool life is unpreferably reduced to increase the working cost in both of face milling and end milling. Therefore, the CBN sintered body tool must cut workpieces which are remarkably deformed or distorted by heat generated in cutting or components to be protected against even the slightest deformation caused by heat generated in cutting under a dry condition or at a low cutting speed V causing no heat cracking under a wet condition.

However, various types of machining equipment rotatable at a high speed are recently developed one after another, and high-speed cutting is necessary and inevitable for improving working efficiency. In relation to such machining equipment, therefore, awaited is provision of an insert tool capable of coping with dry working for suppressing influence exerted on workpieces by increase of the cutting temperature.

While automobile engine components or the like may be milled under a dry condition, the working is performed under a condition identical to the wet condition is a pre-step includes wet working such as rough working or perforation due to a cutting fluid remaining on the working spots, and hence the insert of the tool is still heat-cracked and hence sufficient life cannot be obtained in this case.

SUMMARY OF THE INVENTION

An object of the present invention is to provide a cutting tool for milling which can attain sufficient tool life particularly in high-speed face milling under a wet condition at a cutting speed V of at least 800 m/min. and in high-speed end milling under a wet condition at a cutting speed V of at least 300 m/min.

In order to attain the aforementioned object, the cutting tool for milling according to the present invention comprises an insert consisting of a cubic boron nitride sintered body having heat conductivity of at least 400 W/m.K at 120° C. and a thermal expansion coefficient within the range of at least $3.0\times10^{-6}$/K and not more than $4.0\times10^{-6}$/K in the temperature range of 20° C. to 600° C.

It is inferred that the inventive sintered body tool having such a structure attains long life in high-speed milling under a wet condition for the following reason:

In a conventional CBN sintered body tool which is applicable to milling, the CBN sintered body forming its insert has heat conductivity of less than 400 W/m.K at 20° C. and a thermal expansion coefficient exceeding $4.0\times10^{-6}$/K in the range of 20° C. to 600° C. Under a dry condition, the sintered body can withstand thermal shock since its cutting edge is not rapidly quenched and hence temperature difference in a heat cycle is small. Under a wet condition, however, a remarkable temperature gradient is caused in the vicinity of the cutting edge and high tensile stress is applied to the insert in quenching due to large temperature difference in the heat cycle and high heat conductivity. Further, it is conceived that heat cracking is readily caused by repetition of remarkable expansion and contraction due to the high thermal expansion coefficient.

In the inventive cutting tool for milling, the heat conductivity of the CBN sintered body forming the insert is at least 400 W/m.k and the thermal expansion coefficient is within the range of at least $3.0 \times 10^{-6}$/K and not more than $4.0 \times 10^{-6}$/K in the range of 20° C. to 600° C., whereby heat generated when the insert comes into contact with workpieces in high-speed milling can efficiently escape to the overall sintered body. Further, thermal expansion of the sintered body is small in the vicinity of the insert and the heat moves toward the overall sintered body as described above, whereby a temperature gradient caused between the insert and the interior of the sintered body is so small that tensile stress resulting from thermal expansion difference is reduced. Thus, it is conceivable that the insert is subjected to small tensile stress when rapidly quenched with a cutting fluid in slipping, and thermal shock serving as the main factor for heat cracking can be reduced.

The heat conductivity of the cubic boron nitride sintered body forming the insert is more preferably at least 600 W/m.k at 120° C.

The cubic boron nitride content of the cubic boron nitride sintered body forming the insert is preferably at least 99 volume %. This is because the aforementioned thermophysical values can be attained by increasing the content of CBN, having the highest heat conductivity after that of diamond and a low thermal expansion coefficient, to at least 99 volume % for reliably attaining desired thermophysical properties.

In milling, no desired effect can be attained if the insert is chipped by mechanical impact force when coming into contact with any workpiece from a slipping state due to insufficient mechanical strength. The mechanical strength can be improved by preparing the CBN sintered body from CBN grains of 0.01 to 1.0 $\mu$m in grain size and increasing contact areas of these CBN grains for ensuring the effect of suppressing chipping.

The transverse rupture strength of the CBN sintered body forming the insert of the inventive cutting tool for milling is preferably at least 80 kgf/mm$^2$, in consideration of chipping resistance against mechanical shock.

In application to a milling cutter for face milling, the inventive cutting tool for milling is employed under a wet condition at a cutting speed V of at least 800 m/min., to be capable of attaining long life, which can be attained by the conventional CBN tool under a dry condition. In application to an end mill, on the other hand, the inventive cutting tool for milling is employed under a wet condition at a cutting speed V of at least 300 m/min., to be capable of attaining long life, which can be attained by the conventional CBN tool under a dry condition.

In the inventive cutting tool for milling, as hereinabove described, the insert is prepared from the CBN sintered body having the heat conductivity and the thermal expansion coefficient within the prescribed ranges respectively, while the CBN grain size and the transverse rupture strength thereof are also in the prescribed ranges respectively. Thus, the inventive cutting tool for milling suppresses chipping resulting from heat cracking, can extend the tool life in wet face milling at the cutting speed V of at least 800 m/min. or at least 1000 m/min. and in wet end milling at the cutting speed V of at least 300 m/min. or at least 500 m/min., and can remarkably improve productivity in high-speed milling of components consisting of gray cast iron under a wet condition, in particular.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EXAMPLE 1

Figure 1A:
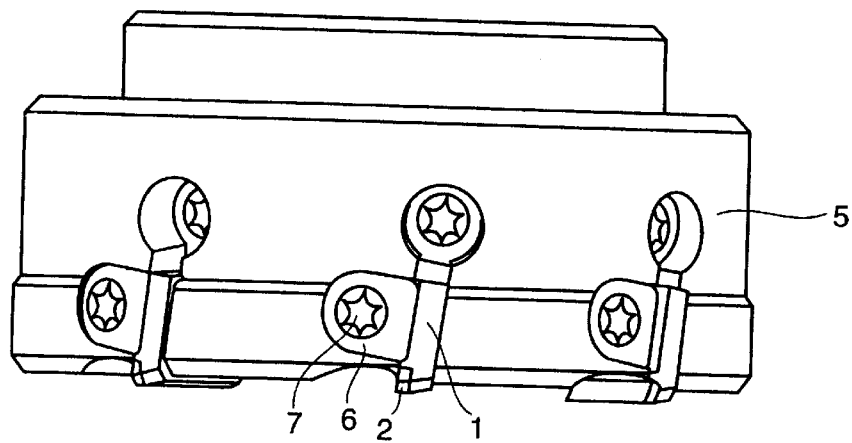
FIGS. 1A and 1B are a plan view and a front elevational view of a conventional face milling cutter employing throw-away tips.
Figure 1B:
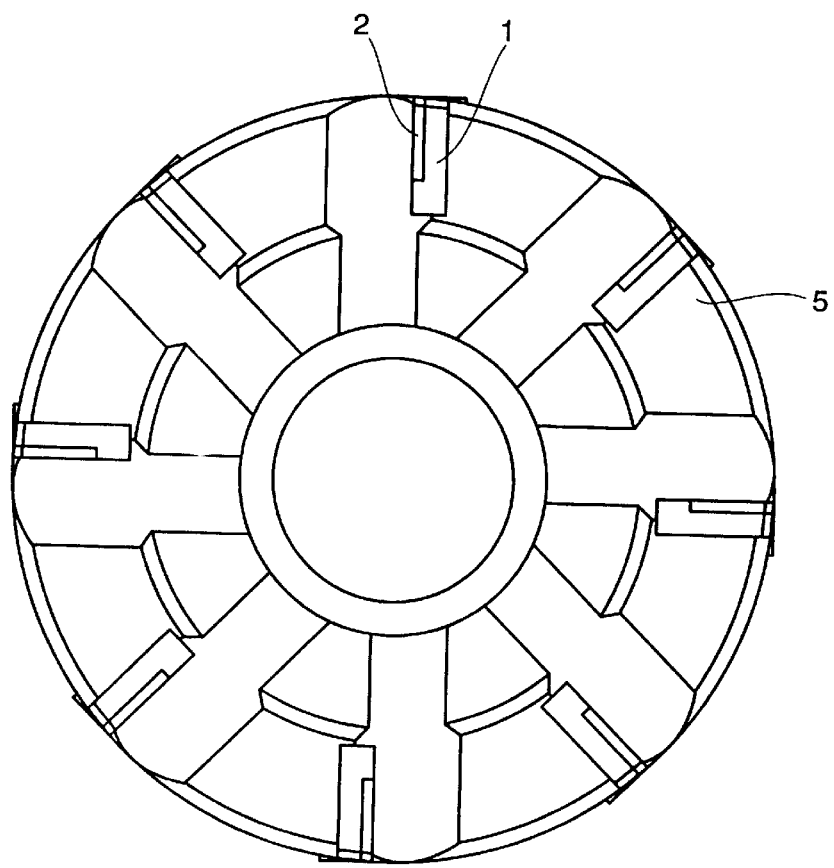

Cutting tool samples Nos. 1 to 10 were prepared with inserts of CBN sintered bodies having physical values shown in Table 1 respectively, and subjected to a milling test for plates (100 by 150 mm in section) of gray cast iron FC250 with face milling cutters. The samples Nos. 1 to 5 are inventive, and the samples Nos. 6 to 10 are comparative. With reference to each sample, Table 1 shows heat conductivity at 120° C., a thermal expansion coefficient in the temperature range of 20° C. to 600° C., and transverse rupture strength in three-point bending measurement at a span of 4 mm. The milling test was performed under the following cutting conditions:

V=800 m/min.
d=0.5 mm
f=0.15 mm/edge

Table 1 shows the results of the test.

TABLE 1

| | No. | Conductivity (W/m · k) | Thermal Expansion (×10$^{-6}$/K) | CBN Content (vol. %) | CBN Grain Size ($\mu$m) | Transverse Rupture Strength (kgf/mm$^2$) | Dry/Wet | Cuttable Pass Count |
|---|---|---|---|---|---|---|---|---|
| Inventive Sample | 1 | 420 | 3.7 | 98.5 | 0.05–0.5 | 80 | dry | 180 |
| | | | | | | | wet | 95 |
| | 2 | 450 | 3.6 | 99.3 | 0.5–3.0 | 75 | dry | 85 |
| | | | | | | | wet | 90 |
| | 3 | 600 | 3.5 | 99.1 | 0.1–1.0 | 85 | dry | 180 |
| | | | | | | | wet | 180 |

TABLE 1-continued

|  | No. | Conductivity (W/m · k) | Thermal Expansion (×10⁻⁶/K) | CBN Content (vol. %) | CBN Grain Size (μm) | Transverse Rupture Strength (kgf/mm²) | Dry/Wet | Cuttable Pass Count |
|---|---|---|---|---|---|---|---|---|
|  | 4 | 650 | 3.5 | 99.8 | 0.5–2.0 | 80 | dry | 165 |
|  |  |  |  |  |  |  | wet | 140 |
|  | 5 | 650 | 3.6 | 99.7 | 0.1–1.0 | 85 | dry | 190 |
|  |  |  |  |  |  |  | wet | 180 |
| Comparative Sample | 6 | 420 | 4.2 | 97.5 | 0.1–1.0 | 80 | dry | 170 |
|  |  |  |  |  |  |  | wet | 25 |
|  | 7 | 650 | 4.2 | 98.2 | 2.3–3.0 | 65 | dry | 2 |
|  |  |  |  |  |  |  | wet | 2 |
|  | 8 | 220 | 5.1 | 70 | 0.5–3.0 | 110 | dry | 170 |
|  |  |  |  |  |  |  | wet | 0 |
|  | 9 | 360 | 4.0 | 85 | 0.5–3.0 | 110 | dry | 200 |
|  |  |  |  |  |  |  | wet | 12 |
|  | 10 | 360 | 3.7 | 95 | 0.5–2.0 | 100 | dry | 180 |
|  |  |  |  |  |  |  | wet | 10 |

As understood from Table 1, each of the inventive cutting tool samples Nos. 1 to 5 exhibited heat conductivity of at least 400 W/m.k at 120° C. and a thermal expansion coefficient within the range of at least $3.0 \times 10^{-6}$/K to $4.0 \times 10^{-6}$/K in the temperature range of 20° C. to 600° C., and attained a high cuttable pass count under a wet cutting condition.

In the comparative cutting tool samples Nos. 6 to 10, on the other hand, the tool life of the sample No. 6 was remarkably reduced with a cuttable pass count of 25 under a wet cutting condition while that under a dry cutting condition was 170. This is conceivably because heat cracking was readily caused due to repetition of remarkable expansion and contraction under the wet cutting condition resulting from the thermal expansion coefficient exceeding $4.0 \times 10^{-6}$/K in the temperature range of 20° C. to 600° C., although the heat conductivity of the cutting tool sample No. 6 was in excess of 400 W/m.k at 120° C.

Further, the tool life of the comparative cutting tool sample No. 7 was extremely short under both dry and wet conditions, despite the high heat conductivity of 650 W/m.K at 120° C. This is conceivably because heat cracking was readily caused due to the thermal expansion coefficient exceeding $4.0 \times 10^{-6}$/K in the temperature range of 20° C. to 600° C. and the mechanical strength was reduced due to the large CBN grain size exceeding 2.0 μm.

The comparative cutting tool sample No. 8, which was capable of cutting workpieces 170 times under a dry cutting condition, was chipped in single cutting under a wet cutting condition, to exhibit extreme difference between the dry and wet conditions. This is conceivably because the heat conductivity of the sample No. 8 was extremely lower than 400 W/m.k, the thermal expansion coefficient was at a high level of $5.1 \times 10^{-6}$/K in the temperature range of 20° C. to 600° C., and the CBN content was at a low level of 70 volume %. The comparative cutting tool samples Nos. 9 and 10 also exhibited extreme difference between dry and wet conditions, to substantiate that the heat conductivity remarkably influences the tool life under a wet cutting condition.

Observing the data of the inventive cutting tool samples Nos. 1 to 5 in detail, it is recognized that the cutting tool sample No. 1 exhibited slightly large difference in tool life between the dry and wet conditions. This is conceivably because the heat conductivity of the sample No. 1 was slightly lower as compared with the samples Nos. 2 to 5 due to the CBN content lower than 99 volume %. The tool life of the sample No. 2 was slightly shorter as compared with the remaining inventive samples, although the same hardly exhibited difference between the dry and wet conditions. This is conceivably because the transverse rupture strength of the sample No. 2 was slightly reduced due to the relatively large CBN grain size.

EXAMPLE 2

In relation to the samples prepared in Example 1, an evaluation test was made by performing face milling under the following conditions:

V=1500 m/min.

d=0.5 mm f=0.15 mm/rev.

Table 2 shows the results.

TABLE 2

|  | No. | Conductivity (W/m · k) | Thermal Expansion (×10⁻⁶/K) | CBN Content (vol. %) | CBN Grain Size (μm) | Transverse Rupture Strength (kgf/mm²) | Dry/Wet | Cuttable Pass Count |
|---|---|---|---|---|---|---|---|---|
| Inventive Sample | 1 | 420 | 3.7 | 98.5 | 0.05–0.5 | 80 | dry | 220 |
|  |  |  |  |  |  |  | wet | 180 |
|  | 2 | 450 | 3.6 | 99.3 | 0.5–3.0 | 75 | dry | 50 |
|  |  |  |  |  |  |  | wet | 40 |
|  | 3 | 600 | 3.5 | 99.1 | 0.1–1.0 | 85 | dry | 300 |
|  |  |  |  |  |  |  | wet | 320 |
|  | 4 | 650 | 3.5 | 99.8 | 0.5–2.0 | 80 | dry | 300 |
|  |  |  |  |  |  |  | wet | 220 |

TABLE 2-continued

|  | No. | Conductivity (W/m · k) | Thermal Expansion (×10⁻⁶/K) | CBN Content (vol. %) | CBN Grain Size (μm) | Transverse Rupture Strength (kgf/mm²) | Dry/Wet | Cuttable Pass Count |
|---|---|---|---|---|---|---|---|---|
|  | 5 | 650 | 3.6 | 99.7 | 0.1–1.0 | 85 | dry | 300 |
|  |  |  |  |  |  |  | wet | 350 |
| Comparative Sample | 6 | 420 | 4.2 | 97.5 | 0.1–1.0 | 80 | dry | 230 |
|  |  |  |  |  |  |  | wet | 15 |
|  | 7 | 650 | 4.2 | 98.2 | 2.3–3.0 | 65 | dry | 0 |
|  |  |  |  |  |  |  | wet | 0 |
|  | 8 | 220 | 5.1 | 70 | 0.5–3.0 | 110 | dry | 80 |
|  |  |  |  |  |  |  | wet | 0 |
|  | 9 | 360 | 4.0 | 85 | 0.5–3.0 | 110 | dry | 300 |
|  |  |  |  |  |  |  | wet | 13 |
|  | 10 | 360 | 3.7 | 95 | 0.5–2.0 | 100 | dry | 300 |
|  |  |  |  |  |  |  | wet | 10 |

As understood from Table 2, the samples attained results substantially similar to those in Example 1 as a total tendency also in high-speed cutting at the cutting speed V of 1500 m/min., although the cuttable pass counts were different from those in Example 1. It is inferred that the influence by the transverse rupture strength remarkably reflected on the difference of the cuttable pass counts in Examples 1 and 2 due to the high-speed cutting condition in Example 2.

EXAMPLE 3

End mills were formed with inserts prepared from the CBN sintered body samples employed in Example 1, and subjected to a lateral cutting test for plates (100 by 150 mm in section) of gray cast iron FC250 under the following cutting conditions:

V=500 m/min.
Ad=3 mm
Rd=0.1 mm
f=0.05 mm/edge

Table 3 shows the results.

As understood from Table 3, the end mill samples exhibited high cuttable pass counts as a whole in the lateral cutting test for plates, due to the working mode different from that in the face milling test. Relatively comparing the samples with each other, it can be said that the samples exhibited a tendency substantially similar to those in Examples 1 and 2 as a whole in relation to the tool life.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cutting tool for milling comprising an insert consisting of a cubic boron nitride sintered body having heat conductivity of at least 400 W/m.k at 120° C. and a thermal expansion coefficient within the range of at least $3.0 \times 10^{-6}$/K and not more than $4.0 \times 10^{-6}$/K in the temperature range of 20° C. to 600° C.

TABLE 3

|  | No. | Conductivity (W/m · k) | Thermal Expansion (×10⁻⁶/K) | CBN Content (vol. %) | CBN Grain Size (μm) | Transverse Rupture Strength (kgf/mm²) | Dry/Wet | Cuttable Pass Count |
|---|---|---|---|---|---|---|---|---|
| Inventive Sample | 1 | 420 | 3.7 | 98.5 | 0.05–0.5 | 80 | dry | 1300 |
|  |  |  |  |  |  |  | wet | 500 |
|  | 2 | 450 | 3.6 | 99.3 | 0.5–3.0 | 75 | dry | 550 |
|  |  |  |  |  |  |  | wet | 550 |
|  | 3 | 600 | 3.5 | 99.1 | 0.1–1.0 | 85 | dry | 1600 |
|  |  |  |  |  |  |  | wet | 2000 |
|  | 4 | 650 | 3.5 | 99.8 | 0.5–2.0 | 80 | dry | 1800 |
|  |  |  |  |  |  |  | wet | 2000 |
|  | 5 | 650 | 3.6 | 99.7 | 0.1–1.0 | 85 | dry | 1700 |
|  |  |  |  |  |  |  | wet | 2000 |
| Comparative Sample | 6 | 420 | 4.2 | 97.5 | 0.1–1.0 | 80 | dry | 1800 |
|  |  |  |  |  |  |  | wet | 2 |
|  | 7 | 650 | 4.2 | 98.2 | 2.3–3.0 | 65 | dry | 3 |
|  |  |  |  |  |  |  | wet | 2 |
|  | 8 | 220 | 5.1 | 70 | 0.5–3.0 | 110 | dry | 2100 |
|  |  |  |  |  |  |  | wet | 0 |
|  | 9 | 360 | 4.0 | 85 | 0.5–3.0 | 110 | dry | 1600 |
|  |  |  |  |  |  |  | wet | 0 |
|  | 10 | 360 | 3.7 | 95 | 0.5–2.0 | 100 | dry | 1300 |
|  |  |  |  |  |  |  | wet | 0 |

2. The cutting tool for milling in accordance with claim 1, wherein said cubic boron nitride sintered body forming said insert has heat conductivity of at least 600 W/m.K at 120° C.

3. The cutting tool for milling in accordance with claim 1, wherein said cubic boron nitride sintered body forming said insert has a cubic boron nitride content of at least 99 volume %.

4. The cutting tool for milling in accordance with claim 1, wherein cubic boron nitride of said cubic boron nitride sintered body forming said insert is at least 0.01 µm and not more than 1 µm in grain size.

5. The cutting tool for milling in accordance with claim 1, wherein said cubic boron nitride sintered body forming said insert has transverse rupture strength of at least 800 kgf/mm$^2$ in three-point bending measurement at a span of 4 mm.

6. The cutting tool for milling in accordance with claim 1, being employed as a face milling cutter under a wet cutting condition at a cutting speed of at least 800 m/min.

7. The cutting tool for milling in accordance with claim 1, being employed as an end mill under a wet cutting condition at a cutting speed of at least 300 m/min.

* * * * *